(12) United States Patent
Carr et al.

(10) Patent No.: US 7,337,733 B2
(45) Date of Patent: Mar. 4, 2008

(54) DISTANCE MEASURING DEVICE FOR PLANTER

(75) Inventors: Brian W Carr, Nevada, IA (US); Scott A Sporrer, Nevada, IA (US); Donald F Handorf, Ames, IA (US); Peter B Moore, Ames, IA (US)

(73) Assignee: Gary W. Clem, Inc., Nevada, IA (US)

( * ) Notice: Subject to any disclaimer, the term of this patent is extended or adjusted under 35 U.S.C. 154(b) by 201 days.

(21) Appl. No.: 11/148,490

(22) Filed: Jun. 9, 2005

(65) Prior Publication Data

US 2006/0278142 A1  Dec. 14, 2006

(51) Int. Cl.
*A01C 5/00* (2006.01)
(52) U.S. Cl. ........................................ 111/200
(58) Field of Classification Search ................ 111/200
See application file for complete search history.

(56) References Cited

U.S. PATENT DOCUMENTS

| | | | |
|---|---|---|---|
| 4,770,551 A * | 9/1988 | Bradford | ...................... 400/90 |
| 4,806,066 A * | 2/1989 | Rhodes et al. | .............. 414/729 |
| 6,474,500 B1 | 11/2002 | Carr et al. | |
| 6,848,243 B2 | 2/2005 | Carr et al. | |

\* cited by examiner

*Primary Examiner*—Christopher J. Novosad

(57) ABSTRACT

A distance measuring device mounted to a planter used to plant crops. The distance measuring device has a cable extending between a first pulley and second pulley wherein the cable has at least one target. A sensor located adjacent the first pulley and connected to a controller sends a signal to the controller when the sensor detects the target. Adjacent the second pulley is an encoder that sends a second signal to the controller based upon the rotation of the second pulley such that the controller can determine the amount of distance that the planter has traveled.

8 Claims, 3 Drawing Sheets

DISTANCE MEASURING DEVICE FOR PLANTER

BACKGROUND OF THE INVENTION

This invention relates to seed planters used in planting experimental crops. More specifically, this invention relates to a distance measuring device attached to a seed planter used to plant experimental crops.

Planters for seed research plots are used to select from different groups of seeds for planting in a short segment of a row, and thence stop the planting in the first segment and to select sequentially seed from another group until a plurality of segments of a row (or more) are planted with seeds from different groups. The seeds from each group represent different types and characteristics of corn seed, for example.

One shortcoming of existing planters is the precision at which the planter is able to place the seed into its rows. Specifically, when plotting a row of seed to be used in an experimental crop, precision is important in order to ensure that only the variables desired to be present by the planter effect the growth of each plant. Where one row is longer than another, planting data can be skewed.

In current planting equipment distance traveled is measured by an encoder associated with the wheel of the planter. Slippage of the wheel can cause up to a twelve-inch variance in the length of the row being planted. This variation in row length causes inaccuracies that skew tests results performed on these plants. Thus, there is a need in the art for an improved planter that more accurately places seeds to be planted within an experimental crop.

Therefore, an object of the present invention is to provide for a more accurate distance measuring device for a planter.

Yet another object of the present invention is to use a pulley system in order to improve the precision of the depositing of a seed for planting a crop.

These and other objects, features, or advantages will become apparent from the specification and claims.

BRIEF SUMMARY OF THE INVENTION

A distance measuring device attached to the frame of a planter, the measuring device having a first pulley in spaced relation to a second pulley with a cable extending therebetween. Located near the first pulley and connected to a controller is a sensor that detects a target mounted on the cable such that the controller activates the planter when the target is detected.

Operatively mounted to the second pulley and connected to the controller is an encoder. The encoder measures the rotation of the second pulley and sends a signal to the controller that calculates the distance that the planter has traveled since the target was detected. When the controller determines that the planter has traveled a pre-determined distance, the planter is de-activated.

DETAILED DESCRIPTION OF THE PREFERRED EMBODIMENT

Figure 1:
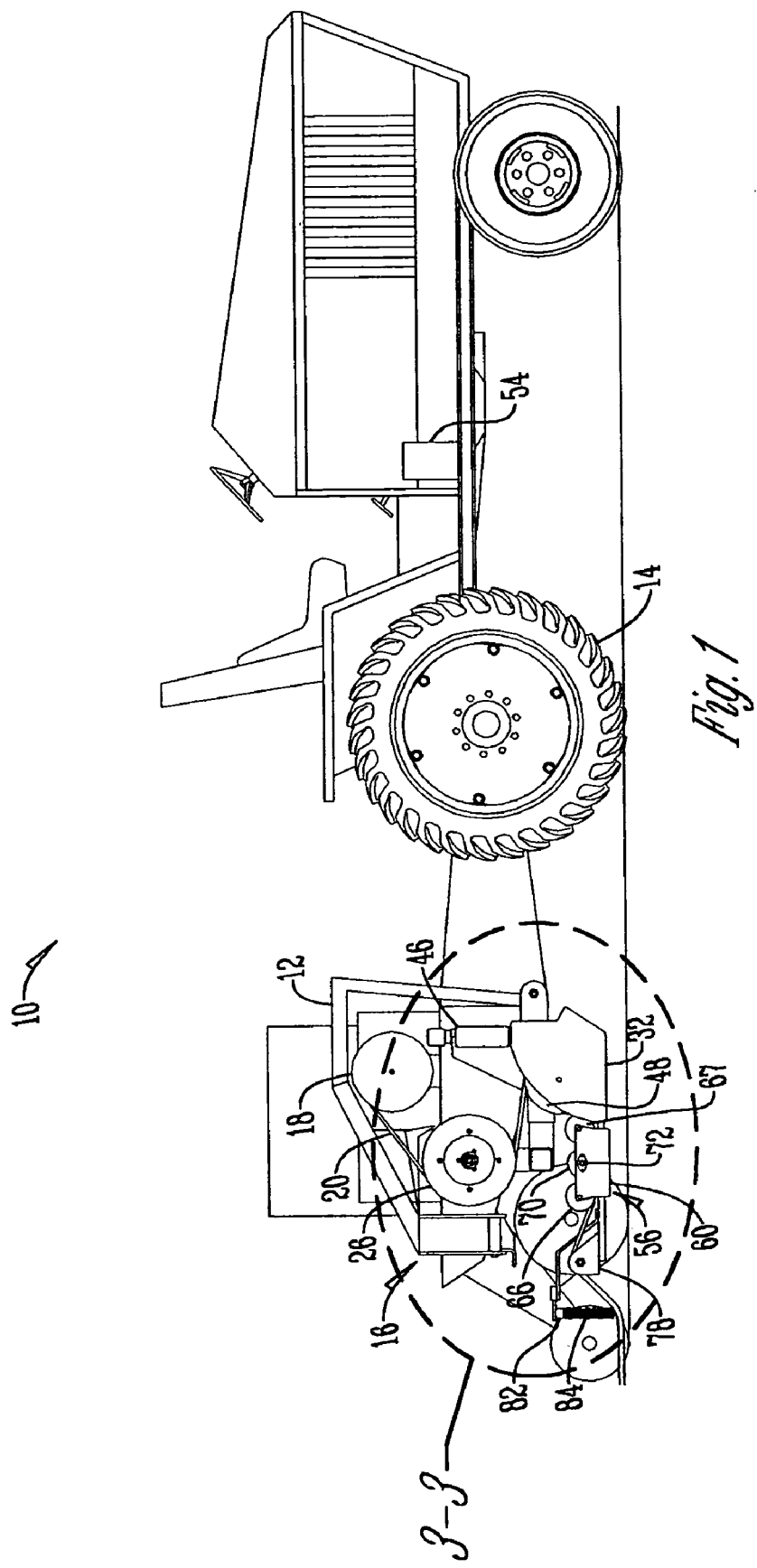
FIG. 1 is plan side view of a planter.

FIG. 1 shows a planter 10 having a framework or body 12 that is supported by a plurality of wheels 14. The planter 10 may be any other vehicle that may be used in order to plant seeds.

Figure 2:
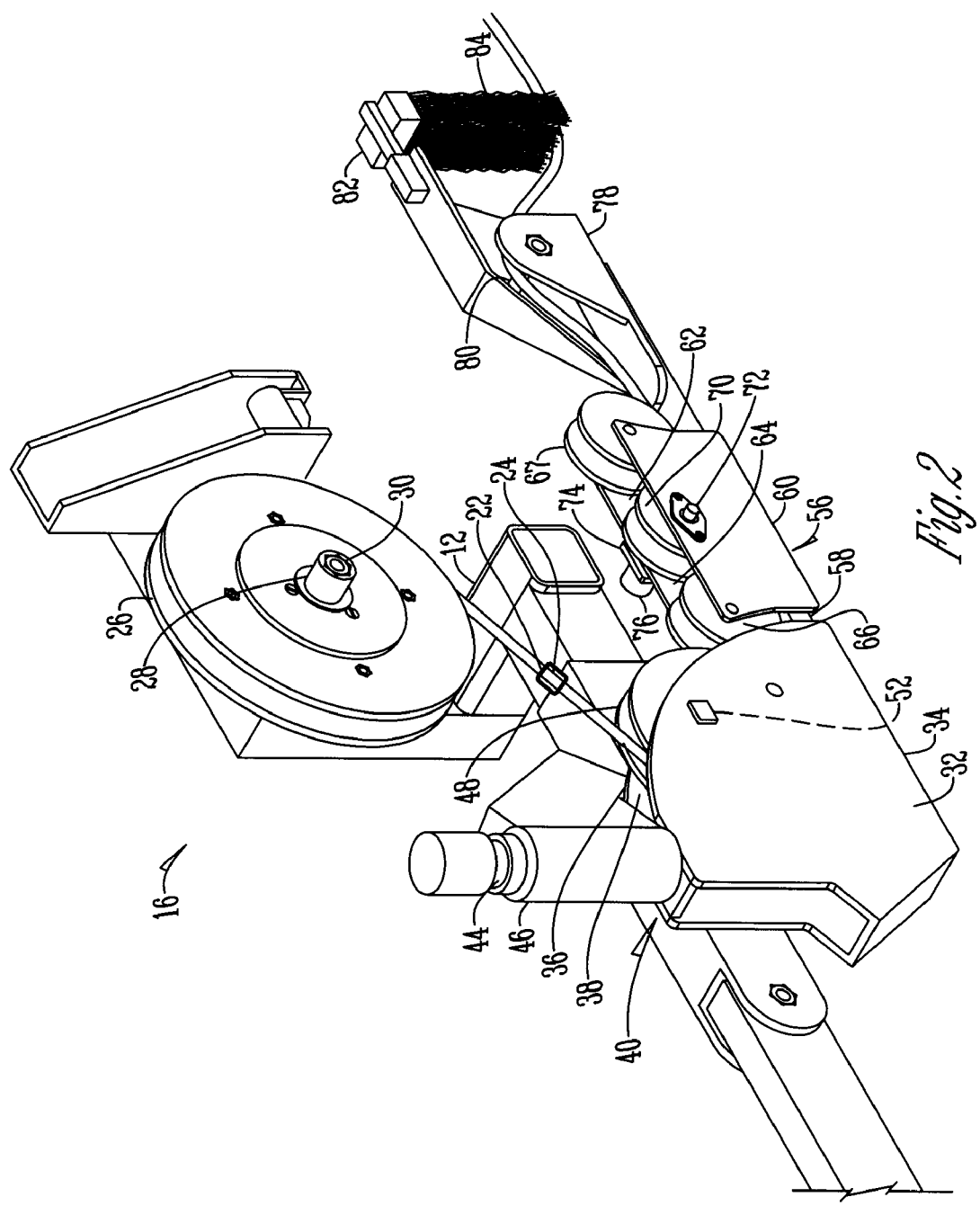
FIG. 2 is a perspective view of a distance measuring device of a planter.
Figure 3:
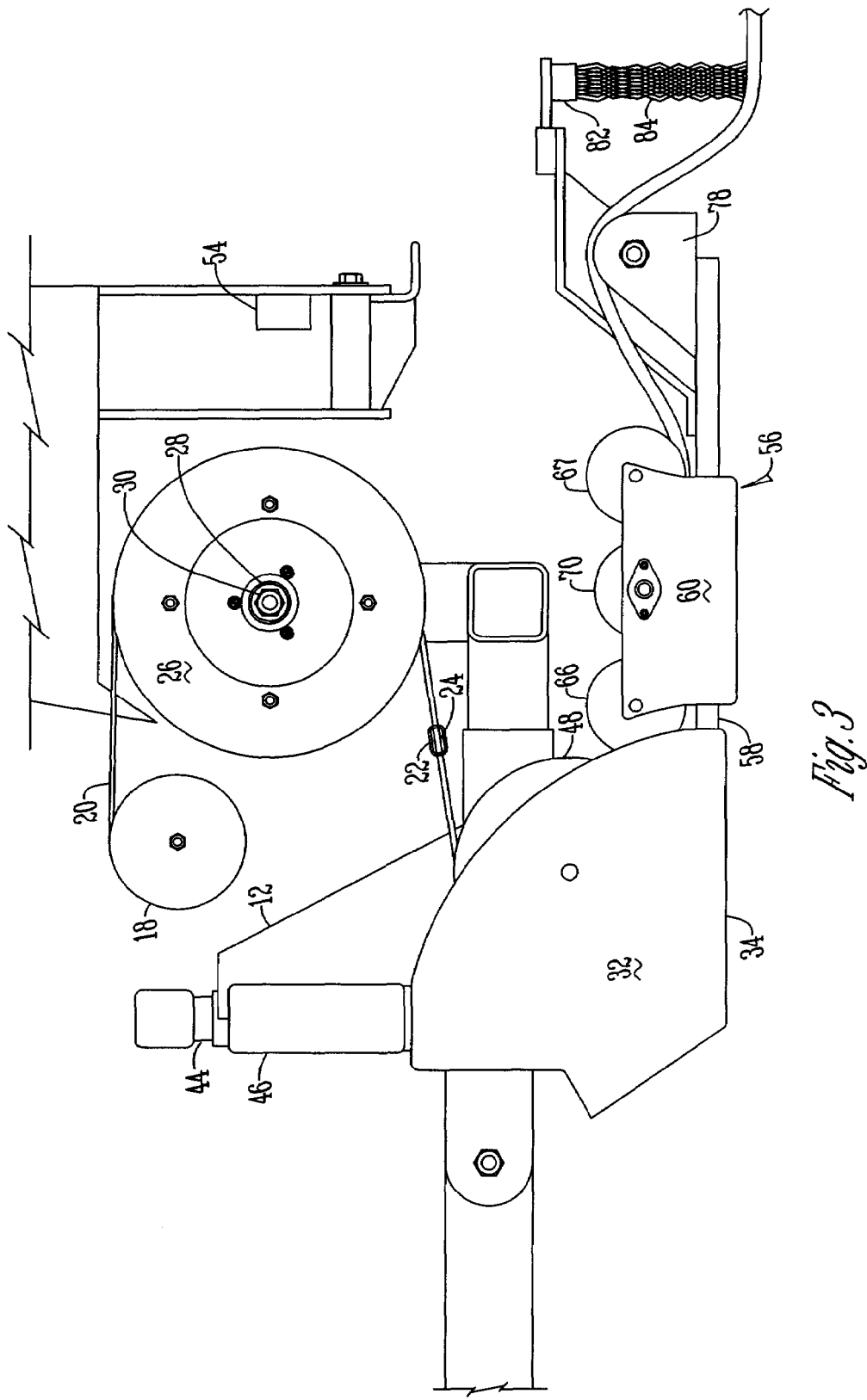
FIG. 3 is a side view of a distance measuring device of a planter.

As shown in FIGS. 2 and 3, a distance measuring assembly 16 is secured to the framework 12 of the planter 10. Measuring device 16 has a spool 18 that is secured to the framework 12. A cable 20 is mounted on the spool 18 and has a plurality of buttons or targets 22 that may also be considered sense buttons. The targets 22 preferably have an elongate body with a bore 24 extending therethrough that receives the cable therein and the targets 22 are punched down and locked securably to the cable 20. The length of the cable and the distance between the targets 22 will determine the plot configuration. Thus, when different plant configurations are desired, different cables 20 are used.

Cable 20 extends from the spool 18 to the leveling pulley 26. Leveling pulley 26 has a centrally located aperture 28 that a bolt 30 is disposed through in order to attach the leveling pulley 26 to the framework 12.

Secured to the framework 12 is a shoe 32 that comprises a front face 34 and a back face 36 that are in spaced relation forming a cavity 38 therebetween. The front face 34 and back face 36 are secured together and are attached to a vertical hinge 40 having a center opening so that a pin 44 may be extended through the opening to allow for pivoting of the shoe 32 around the pin 44. The pin 44 additionally extends upwardly through a cylindrical sleeve member 46 that is part of the framework 12 to pivotally connect the vertical hinge 40 to the framework 12. Disposed within the cavity 38 of the shoe 32 is a corner pulley 48 that has a rotatable shaft disposed therethrough and is rotatably connected to the front and back faces 34, 36 of the shoe 32. The cable 20 extends from the leveling pulley 26 to corner pulley 48.

Also mounted to the shoe 32 is at least one sensor 52 that is connected to a controller 54. In one embodiment this sensor 52 is a proximity sensor.

Secured to and extending from the front and back faces 34, 36 of the shoe 32 are a support arm member 56. Support arm member 56 has an elongated support member 58. Secured to the support member 58 are first and second plates 60 and 62 that are in spaced relation to form a space 64 therebetween. Within the space 64 are a plurality of pulleys. In one embodiment the plurality of pulleys comprises three separate pulleys that are in linear alignment wherein the two exterior pulleys are first and second tension pulleys 66, 67 that are rotatably secured to the first and second plates 60, 62 of the support arm member 56 via shafts. Disposed between the two tension pulleys 66, 67 is a measuring pulley 70 rotatably mounted on an elongated shaft/axle 72. The cable 20 extends from the corner pulley 48 and underneath the first tension pulley 66, over the top of the measuring pulley 70, and back underneath the second tension pulley 67.

Mounted to shaft 72 is an encoder 76 that is connected to the controller 54. In one embodiment the encoder 76 is an optical encoder. The encoder 76 senses the rotation of the measuring pulley 70 and sends pulses to the controller 54. One pulse represents a single rotation of the measuring pulley 70. Thus, depending on the number of pulses that the encoder 76 sends to the controller 54, the controller 54 calculates the distance traveled by the cable 20.

Extending from the arm support member 56 is an extension 78 that holds a second spool 80 so that the cable 20 may wrap around the spool 80. Extending from this extension 78 is a brush 82 that has a plurality of bristles 84 to ensure a level ground surface as the planter 10 traverses across the land.

In operation, as the planter 10 traverses a field, the cable 20 unravels from the spool 18 through the measuring device 16 to the ground. As a target 22 travels past the corner pulley 48, sensor 52 detects the target 22 and sends a signal to the controller 54 which activates the planter 10. The controller 54 also zeros out its count from encoder 76.

As the cable 20 continues to unravel the measuring pulley 70 rotates. The encoder 76 sends a signal to the controller 54 for each rotation of the measuring pulley 70. Based on the diameter of the measuring pulley 70 and the number of rotations, the controller calculates the distance the planter 10 has traveled. When the controller 54 determines that the planter 10 has traveled a pre-determined distance, the planter 10 is de-activated until sensor 52 detects the next target 22.

When the planter 10 reaches the end of a field, the shoe 32 is rotated about pin 44. As the planter 10 travels back across the field, spool 18 rotates in the opposite direction and the cable 20 travels through the measuring device 16 and wraps around the spool 18. The sensor 52 and encoder 76 operate in a similar manner as before to activate and de-activate the planter.

By using the above described device, seeds are now planted in rows having uniform length because there is little slippage between the cable and the measuring pulley. Accordingly, the data obtained from crop is more accurate.

It will be appreciated by those skilled in the art that other various modifications could be made to the device without the parting from the spirit in scope of this invention. All such modifications and changes fall within the scope of the claims and are intended to be covered thereby.

What is claimed is:

1. A distance measuring device for a planter, comprising:
    a cable extending between a first pulley and a second pulley and having at least one target;
    a sensor adjacent the first pulley and connected to a controller that sends a signal to said controller when the sensor detects a target; and
    an encoder adjacent the second pulley that sends a signal to the controller based on the rotation of the second pulley;
    wherein the controller activates a planter when the controller receives a signal from the sensor.

2. The distance measuring device of claim 1 wherein the controller calculates a distance that the planter travels based on the number of rotations of the second pulley.

3. The distance measuring device of claim 1 wherein the controller de-activates the planter when the planter travels a pre-determined distance.

4. The distance measuring device of claim 1 wherein the planter has a framework and a shoe pivotably connected to a fixture.

5. The distance measuring device of claim 1 wherein the first pulley is rotatably connected to a shoe.

6. The distance measuring device of claim 5 further comprising a brush adjacent a support arm member.

7. The distance measuring device of claim 1 further comprising a third and fourth pulleys aligned with the second pulley for receiving the cable.

8. The distance measuring device of claim 1 wherein the second pulley is rotatable within a support arm member.

* * * * *